(12) United States Patent
Wang et al.

(10) Patent No.: US 9,875,419 B2
(45) Date of Patent: Jan. 23, 2018

(54) RECOGNITION DEVICE AND ALIGNMENT SYSTEM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Wenhao Wang, Beijing (CN); Yanping Hong, Beijing (CN); Defa Ruan, Beijing (CN); Chao Zhang, Beijing (CN); Peng Yu, Beijing (CN); Taoqing Zhou, Beijing (CN)

(73) Assignees: BOE Technology Group Co., LTD, Beijing (CN); Hefei Xinsheng Optoelectronics Technology Co., LTD, Hefei, Anhui (CN)

( * ) Notice: Subject to any disclaimer, the term of this patent is extended or adjusted under 35 U.S.C. 154(b) by 325 days.

(21) Appl. No.: 14/744,585

(22) Filed: Jun. 19, 2015

(65) Prior Publication Data

US 2016/0203378 A1   Jul. 14, 2016

(30) Foreign Application Priority Data

Jan. 13, 2015   (CN) .......................... 2015 1 0016989

(51) Int. Cl.
 *G06K 9/00* (2006.01)
 *G06K 9/20* (2006.01)
 (Continued)

(52) U.S. Cl.
 CPC .......... *G06K 9/2027* (2013.01); *G01B 11/272* (2013.01); *G02F 1/1303* (2013.01);
 (Continued)

(58) Field of Classification Search
 None
 See application file for complete search history.

(56) References Cited

U.S. PATENT DOCUMENTS 4,869,593 A * 9/1989 Biegen ................. G01B 11/303
                                                        356/495
5,434,687 A * 7/1995 Kawata ............. G02F 1/133753
                                                        349/110
(Continued)

FOREIGN PATENT DOCUMENTS

CN       101241313 A     8/2008
CN       101564795 A    10/2009
(Continued)

OTHER PUBLICATIONS

Office action dated Nov. 30, 2016 for CN application 201510016989.X.

*Primary Examiner* — Jay Patel
*Assistant Examiner* — Shadan E Haghani
(74) *Attorney, Agent, or Firm* — Nath, Goldberg & Meyer; Joshua B. Goldberg

(57) ABSTRACT

Embodiments of the present invention provide a recognition device and an alignment system. The recognition device is configured to recognize an alignment mark on a display substrate and comprises a camera unit and a light source unit. The camera unit is configured to shoot the alignment mark, and the light source unit is configured to radiate emitted light onto the alignment mark. The recognition device further comprises a light processing unit configured to process light emitted from the light source unit so that the luminance of the light irradiated onto the alignment mark is greater than that of the light emitted from the light source unit. Through the arrangement of the light processing unit, the recognition device enables the luminance of the light irradiated onto the alignment mark to be greater than that of the light emitted from the light source unit.

16 Claims, 5 Drawing Sheets

(51) Int. Cl.
*H04N 5/225* (2006.01)
*H04N 5/232* (2006.01)
*G02F 1/13* (2006.01)
*G01B 11/27* (2006.01)

(52) U.S. Cl.
CPC ....... *G06K 9/00671* (2013.01); *H04N 5/2253* (2013.01); *H04N 5/2256* (2013.01); *H04N 5/23216* (2013.01); *H04N 5/23296* (2013.01)

(56) References Cited

U.S. PATENT DOCUMENTS

| | | | | |
|---|---|---|---|---|
| 5,889,593 | A * | 3/1999 | Bareket | G01B 11/0633 356/445 |
| 6,414,797 | B1 * | 7/2002 | Videen | G02B 5/04 359/631 |
| 2003/0085334 | A1 * | 5/2003 | Reznichenko | B41J 2/465 250/201.5 |
| 2005/0019921 | A1 * | 1/2005 | Orwar | A61N 1/30 435/446 |
| 2006/0196858 | A1 * | 9/2006 | Barron | A44C 17/00 219/121.69 |
| 2013/0100431 | A1 * | 4/2013 | Kajiyama | G03F 9/7084 355/72 |
| 2013/0100461 | A1 * | 4/2013 | Wischnewski | G02B 21/32 356/614 |

FOREIGN PATENT DOCUMENTS

| | | |
|---|---|---|
| CN | 102316713 A | 1/2012 |
| CN | 102789747 A | 11/2012 |
| KR | 20100023258 A | 3/2010 |

* cited by examiner

-- Prior Art --

RECOGNITION DEVICE AND ALIGNMENT SYSTEM

FIELD OF THE INVENTION

The present invention relates to the field of display technology, in particular to a recognition device and an alignment system.

BACKGROUND OF THE INVENTION

In the preparation technology of liquid crystal display panels (e.g., the preparation technology of an array substrate and a color filter substrate and a technology for assembling the array substrate and the color filter substrate to form a cell), as it is required to accurately place a substrate at an ideal position during the transportation, clamping and processing of the substrate, the position of the substrate needs to be aligned and corrected prior to placement so as to ensure the accuracy of a corresponding operation. The alignment accuracy of the substrate directly influences the production quality of liquid crystal displays, so the accuracy of an alignment system is highly required.

An alignment system generally recognizes the position and shape of an alignment mark provided on a substrate, and thus realizes accurate alignment of the substrate. At present, the recognition of an alignment mark is generally realized by an alignment mark recognition device. A camera is provided in the alignment mark recognition device, and the camera can capture the position and shape of the alignment mark on the substrate by shooting. Then, the position of the substrate is adjusted according to the position and shape of the alignment mark, so that the substrate 4 may be accurately aligned finally.

In an alignment mark recognition device in the prior art, to enable the camera to clearly capture the position and shape of the alignment mark on the substrate, a light source box is provided between the camera and the substrate. As shown in FIG. 1, light emitted form a side light source is reflected onto the alignment mark 41 of the substrate 4 by a glass plate 5 in the middle of the light source box 21, and then the camera located above the light source box 21 receives the light reflected by the alignment mark 41 and thus captures the position and shape of the alignment mark 41. In this method for irradiating the alignment mark 41 by reflecting light emitted from the side light source by the middle transparent glass plate 5, the luminance on the alignment mark 41 is small, and the contrast ratio of the alignment mark 41 captured by the camera is low. As a result, this is very likely to result in the inaccurate alignment of the substrate, and the quality of liquid crystal displays is thus influenced.

SUMMARY OF THE INVENTION

In view of the above technical problems in the prior art, embodiments of the present invention provide a recognition device and an alignment system. The recognition device may increase the luminance on the surface of an alignment mark, improve the contrast ratio and clarity of an alignment mark shot by a camera unit and thus enhance the recognition capability of the recognition device with respect to the alignment mark, so that the alignment accuracy of a display substrate may be further improved.

Embodiments of the present invention provide a recognition device, configured to recognize an alignment mark on a display substrate and including a camera unit and a light source unit, the camera unit being configured to shoot the alignment mark, the light source unit being configured to radiate emitted light onto the alignment mark, wherein the recognition device further includes a light processing unit configured to process light emitted from the light source unit so that the luminance of the light irradiated onto the alignment mark is greater than that of the light emitted from the light source unit.

Preferably, the camera unit includes a camera, and the light source unit includes a light source box, the camera being disposed right above the light source box, the alignment mark being positioned right below the light source box during recognition;

both an upper surface and a lower surface, which are opposite to each other, of the light source box may transmit light, and the light processing unit includes a concave lens disposed on the upper surface and a convex lens disposed on the lower surface; the light source box further includes a transmission-reflection mirror disposed between the upper surface and the lower surface, and a light source disposed on an opposite side of the transmission-reflection mirror;

light emitted from the light source may be irradiated onto the transmission-reflection mirror; the transmission-reflection mirror may reflect the light onto the convex lens; the convex lens may gather the light and then radiate the gathered light onto the alignment mark; and, the light reflected from the alignment mark may enter the camera successively through the convex lens, the transmission-reflection mirror and the concave lens.

Preferably, the upper surface is parallel to the lower surface, the transmission-reflection mirror is a plane mirror, and acute included angles between the transmission-reflection mirror and the upper surface and between the transmission-reflection mirror and the lower surface are 45°; and, the light emitted from the light source is parallel light, and an acute included angle between the parallel light and the transmission-reflection mirror is 45°.

Preferably, a primary optical axis of the convex lens is vertical to the upper surface and the lower surface; and, during recognition, the alignment mark is positioned on the primary optical axis of the convex lens, and a distance between the alignment mark and the convex lens ranges from 0.5f to 1.5f, where f is a focal distance of the convex lens.

Preferably, the primary optical axis of the convex lens coincides with that of the concave lens, and a distance d between the convex lens and the concave lens is equal to f-f', where f' is a focal distance of the concave lens.

Preferably, the camera unit further includes an adjustment part configured to adjust the focal distance of the camera.

Preferably, the adjustment part includes an adjustment scaleplate and an adjustment knob, the adjustment knob being configured to adjust the focal distance of the camera according to the scale on the adjustment scaleplate so as to allow the camera to take a zoomed-in, zoomed-out or unchanged image of the alignment mark.

Preferably, the recognition device further includes a support frame configured to support the camera unit and the light source unit.

Preferably, the display substrate includes an array substrate and a color filter substrate.

Embodiments of the present invention further provide an alignment system, including the above recognition device.

In the recognition device provided by embodiments of the present invention, through the arrangement of the light processing unit, the luminance of the light irradiated onto the alignment mark may be allowed to be greater than that of the light emitted from the light source unit. Compared with the prior art, the luminance on the surface of the alignment mark is increased, the contrast ratio and clarity of the alignment mark shot by the camera unit are improved, and the recognition capability of the recognition device with respect to the alignment mark is thus enhanced. Accordingly, the alignment accuracy of a display substrate may be further improved, and the quality of a display product using the display substrate is thus improved.

In the alignment system provided by embodiments of the present invention, by using the recognition device, the alignment accuracy of the alignment system with respect to the display substrate is improved, and the quality of a display product using the display substrate is thus improved.

DETAILED DESCRIPTION OF THE EMBODIMENTS

To make those skilled in the art better understand the technical solutions of the present invention, the recognition device and alignment system provided by embodiments of the present invention will be further described as below in detail in conjunction with the accompanying drawings and specific implementations.

Embodiment 1

Figure 1:
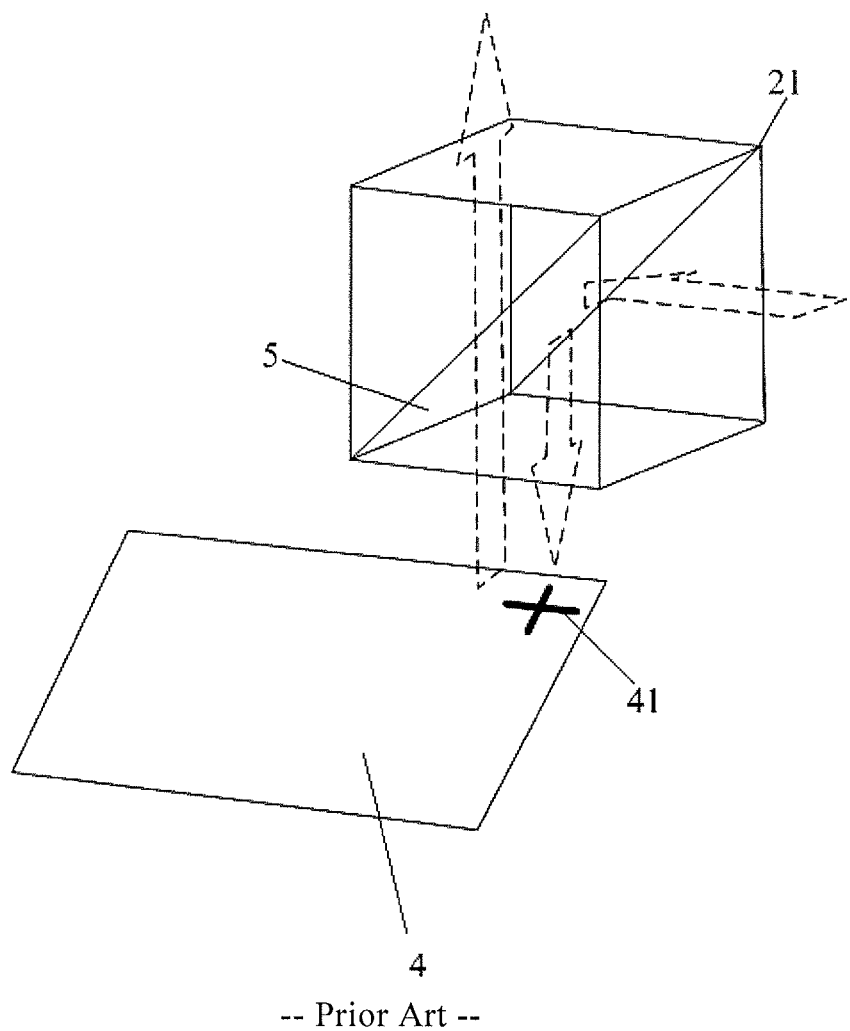
FIG. 1 is a structure diagram of a light source box in a recognition device in the prior art.
Figure 2:
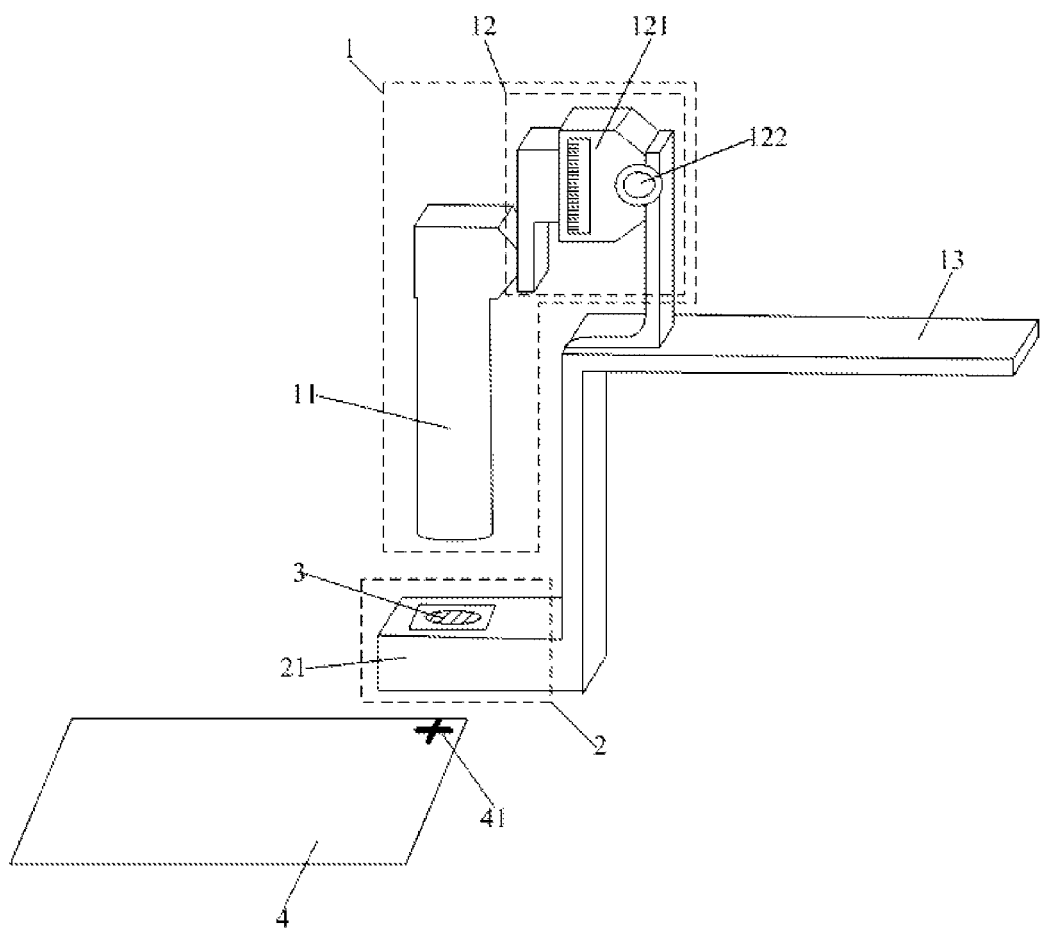
FIG. 2 is a structure diagram of a recognition device according to Embodiment 1 of the present invention.

This embodiment provides a recognition device, as shown in FIG. 2, configured to recognize an alignment mark 41 on a display substrate 4. The recognition device includes a camera unit 1 and a light source unit 2, wherein the camera unit 1 is configured to shoot the alignment mark 41, and the light source unit 2 is configured to irradiate emitted light onto the alignment mark 41. The recognition device further includes a light processing unit 3 configured to process light emitted from the light source unit 2 so that the luminance of the light irradiated onto the alignment mark 41 is greater than that of the light emitted from the light source unit 2.

The luminance refers to luminous flux received by the surface of an object being shot (i.e., the alignment mark 41) per unit area, and the luminous flux is luminous flux of the vertical irradiation received by the surface of the alignment mark 41 per unit area.

The arrangement of the light processing unit 3 enables the luminance of the light irradiated onto the alignment mark 41 to be greater than that of the light emitted from the light source unit 2. Compared with the prior art, the luminance on the surface of an alignment mark 41 is increased, the contrast ratio and clarity of the alignment mark 41 shot by the camera unit 1 are improved, the recognition capability of the recognition device with respect to the alignment mark 41 is enhanced, and the alignment accuracy of the display substrate 4 may be further improved.

In this embodiment, the camera unit 1 includes a camera 11, and the light source unit 2 includes a light source box 21. The camera 11 is disposed right above the light source box 21, and the alignment mark 41 is positioned right below the light source box 21 during recognition.

Figure 3:
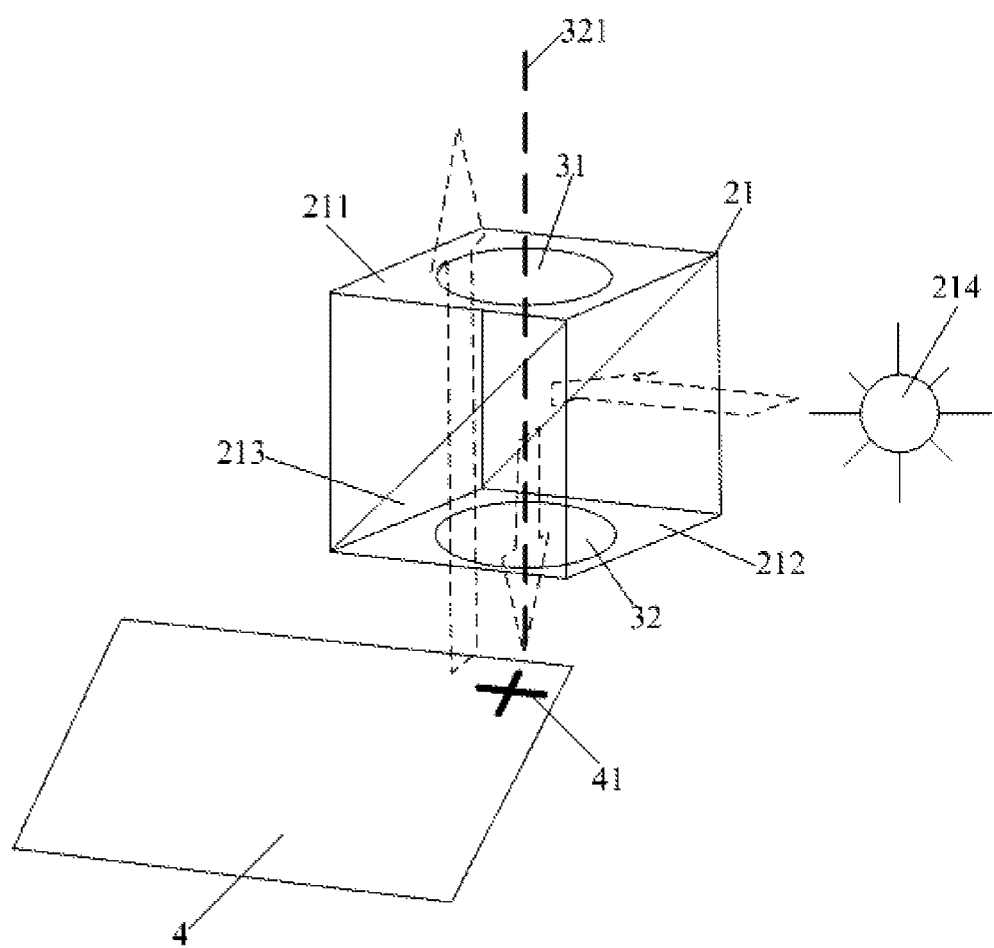
FIG. 3 is a structure diagram of a light source box in FIG. 2.

As shown in FIG. 3, both an upper surface 211 and a lower surface 212, which are opposite to each other, of the light source box 21 may transmit light, and the light processing unit 3 includes a concave lens 31 disposed on the upper surface 211 and a convex lens 32 disposed on the lower surface 212; the light source box 21 further includes a transmission-reflection mirror 213 disposed between the upper surface 211 and the lower surface 212, and a light source 214 disposed on an opposite side of the transmission-reflection mirror 213. Light emitted from the light source 214 may be irradiated onto the transmission-reflection mirror 213, the transmission-reflection mirror 213 may reflect the light onto the convex lens 32, and the convex lens 32 may gather the light and then irradiate the gathered light onto the alignment mark 41. The light reflected from the alignment mark 41 may enter the camera 11 successively through the convex lens 32, the transmission-reflection mirror 213 and the concave lens 31.

After the convex lens 32 gathers the light irradiated onto the alignment mark 41, the luminous flux received by the alignment mark 41 per unit area may be increased. Compared with non-gathered light emitted from the light source 214, the luminance of the light irradiated onto the alignment mark 41 is greater than that of the light emitted from the light source 214. Accordingly, the contrast ratio and clarity of the alignment mark shot by the camera 11 are improved, the recognition capability of the recognition device with respect to the alignment mark 41 is enhanced, and the alignment accuracy of the display substrate 4 may be further improved.

In this embodiment, the upper surface 211 is parallel to the lower surface 212, the transmission-reflection mirror 213 is a plane mirror, and acute included angles between the transmission-reflection mirror 213 and the upper surface 211 and between the transmission-reflection mirror 213 and the lower surface 212 are 45°; and, the light emitted from the light source 214 is parallel light, and an acute included angle between the parallel light and the transmission-reflection mirror 213 is 45°.

In this embodiment, a primary optical axis 321 of the convex lens 32 is vertical to both the upper surface 211 and the lower surface 212; and, during recognition, the alignment mark 41 is positioned on the primary optical axis 321 of the convex lens 32, and a distance between the alignment mark 41 and the convex lens 32 ranges from 0.5f to 1.5f, where f is a focal distance of the convex lens 32.

Figure 4:
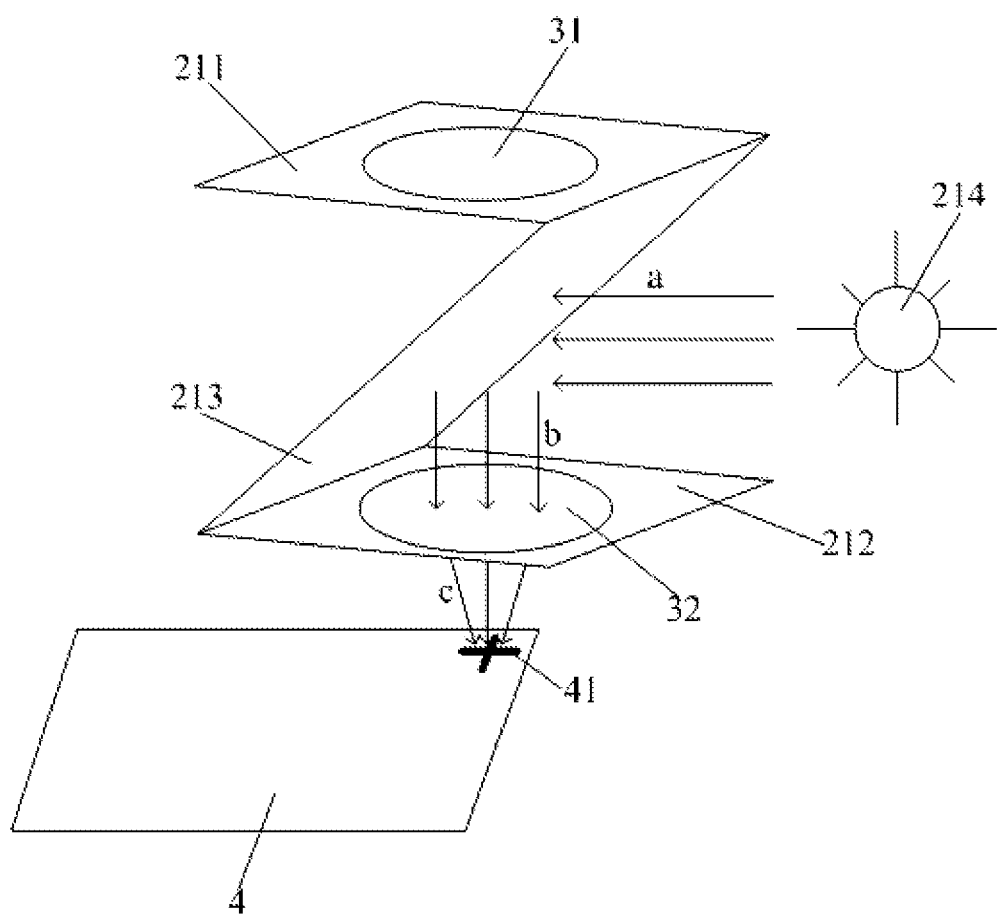
FIG. 4 is a schematic diagram of a light path, by which light emitted from a light source is irradiated onto an alignment mark, in the recognition device in FIG. 2.

According to the above arrangement of the convex lens 32, a specific light path by which the light emitted from the light source 214 is irradiated onto the alignment mark 41 is as follows: as shown in FIG. 4, taking the distance between the alignment mark 41 and the convex lens 32 being 1f as an example, parallel light a emitted from the light source 214 is irradiated onto the transmission-reflection mirror 213, and the included angle between the parallel light a and a mirror surface of the transmission-reflection mirror 213 is 45°. Light b reflected by the transmission-reflection mirror 213 is still parallel light, and the light b is irradiated onto the convex lens 32 along a direction parallel to the primary optical axis 321 of the convex lens 32. As the alignment mark 41 is positioned at a focus of the convex lens 32 (i.e., 1× focal distance of the convex lens 32), and the light b entering the convex lens 32 is parallel light along the direction of the primary optical axis 321, light c passing through the convex lens 32 will be gathered onto the focus of the convex lens 32, that is, the light c is gathered onto the alignment mark 41. Through the gathering of the convex lens 32 with respect to the light emitted from the light source 214, the luminous flux of the light irradiated onto the alignment mark 41 per unit area is obviously greater than that of the light, emitted from the light source 214, directly irradiated onto the alignment mark 41 per unit area. In other words, through the gathering of the convex lens 32 with respect to the light emitted from the light source 214, the luminance on the surface of the alignment mark 41 is improved.

In this embodiment, the primary optical axis of the convex lens 32 coincides with that of the concave lens 31, and a distance d between the convex lens 32 and the concave lens 31 is equal to f-f', where f' is a focal distance of the concave lens 31. According to the optical principle of the convex lens 32 and the concave lens 31, such an arrangement enables light exiting from the concave lens 31 to be still parallel light after the parallel light entering the concave lens 32 successively passes through the convex lens 32 and the concave lens 31, so that an object (e.g., the alignment mark 41) which emits parallel incident light will not be subjected to any deformation or image distortion when being shot or watched on the concave lens 31 side.

Figure 5:
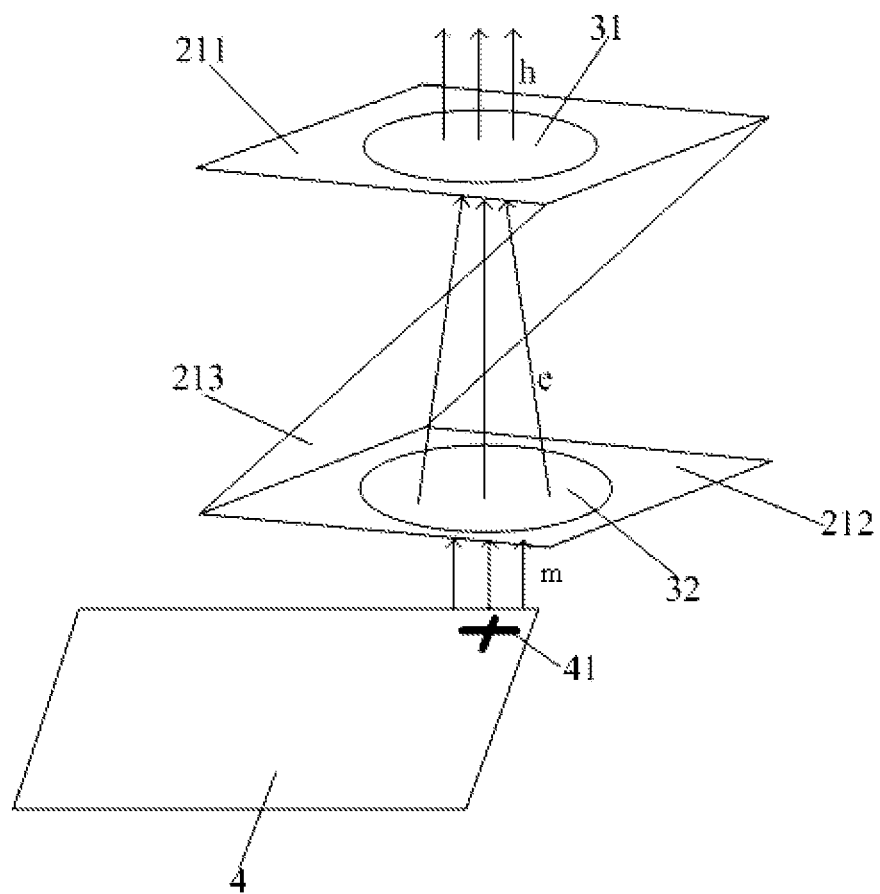
FIG. 5 is a schematic diagram of a light path, by which light reflected by the alignment mark enters a camera, in the recognition device in FIG. 2.

According to the arrangement of the convex lens 32 and the concave lens 31, a specific light path by which light reflected by the alignment mark 41 is captured by the camera 11 after successively passing through the convex lens 32 and the concave lens 31 is as follows: as shown in FIG. 5, as the luminance is luminous flux of the vertical irradiation received by the alignment mark 41 per unit area, in the light reflected by the alignment mark 41 and captured by the camera 11, parallel light reflected by the alignment mark 41 is only taken into consideration in this embodiment. Light m reflected by the alignment mark 41 is parallel light, and the light m enters the convex lens 32. The convex lens 32 may gather the parallel light to its focus, and light e gathered by the convex lens 32 is irradiated onto the concave lens 31. As the distance d between the convex lens 32 and the concave lens 31 is equal to f-f', that is, the focus of the convex lens 32 and the focus (also referred to as virtual focus) of the concave lens 31 coincide above the concave lens 31, in accordance with the optical principle of the concave lens 31, extension lines of the light irradiated onto the concave lens 31 are gathered onto the virtual focus of the concave lens 31, so that the light irradiated onto the concave lens 31 may be converted into parallel light after passing through the convex lens 31. Accordingly, emergent light h formed after the light e passes through the concave lens 31 is parallel light, and the light h may be captured by the camera 11 disposed right above the concave lens 31, so that the camera 11 completes the shooting of the alignment mark 41.

As the luminance of light irradiated by the light source 214 onto the alignment mark 41 is improved, thus by means of the light path, the luminance of light reflected by the alignment mark 41 and finally captured by the camera 11 is also improved. Accordingly, the contrast ratio and clarity of the alignment mark 41 shot by the camera 11 are improved, the recognition capability of the recognition device with respect to the alignment mark 41 is enhanced, and the alignment accuracy of the display substrate 4 may be further improved.

In this embodiment, as shown in FIG. 2, the camera unit 1 further includes an adjustment part 12 configured to adjust the focal distance of the camera 11. The adjustment part 12 can adjust the clarity of the image of the alignment mark 41 shot by the camera 11 by adjusting the focal distance of the camera 11, so that the image of the alignment mark 41 shot by the camera 11 is clearer.

In this embodiment, the adjustment part 12 includes an adjustment scaleplate 121 and an adjustment knob 122. The adjustment knob 122 adjusts the focal distance of the camera 11 according to the scale on the adjustment scaleplate 121 so as to allow the camera 11 to take a zoomed-in, zoomed-out or unchanged image of the alignment mark. The arrangement of the adjustment part 12 may further improve the clarity of the alignment mark 41 shot by the camera 11 and thus improve the recognition capability of the recognition device with respect to the alignment mark 41.

In this embodiment, the recognition device further includes a support frame 13 configured to support the camera unit 1 and the light source unit 2. The arrangement of the support frame 13 enables the position of the camera unit 1 to more accurately correspond to the position of the light source unit 2, so that the recognition device may more accurately recognize the alignment mark 41.

In this embodiment, the display substrate 4 includes an array substrate and a color filter substrate. Obviously, the display substrate 4 may also be other substrates, and the alignment of these display substrates 4 can be realized by recognizing alignment marks 41 provided thereon.

In the recognition device provided by Embodiment 1, through the arrangement of the light processing unit, the luminance of the light irradiated onto the alignment mark may be allowed to be greater than that of the light emitted from the light source unit. Compared with the prior art, the luminance on the surface of an alignment mark is increased, the contrast ratio and clarity of the alignment mark shot by the camera unit are improved, and the recognition capability of the recognition device with respect to the alignment mark is thus enhanced. Accordingly, the alignment accuracy of a display substrate may be further improved, and the quality of a display product using the display substrate is thus improved.

Embodiment 2

This embodiment provides an alignment system including the recognition device in Embodiment 1.

By using the recognition device in Embodiment 1, the alignment accuracy of the alignment system with respect to the display substrate is improved, and the quality of a display product using the display substrate is thus improved.

It should be understood that, the foregoing implementations are merely exemplary implementations for describing the principle of the present invention, but the present invention is not limited thereto. Various variations and improvements may be made by a person of ordinary skill in the art without departing from the spirit and essence of the present invention, and these variations and improvements shall fall into the protection scope of the present invention.

The invention claimed is:

1. A recognition device, configured to recognize an alignment mark on a display substrate and comprising a camera unit and a light source unit, the camera unit being configured to shoot the alignment mark, the light source unit being configured to radiate light onto the alignment mark, wherein the recognition device further comprises a light processing unit configured to process light emitted from the light source unit so that the luminance of the light irradiating onto the alignment mark is greater than the luminance of the light emitted from the light source unit, wherein the camera unit comprises a camera, and the light source unit comprises a light source box, the camera being disposed right above the light source box, the alignment mark being positioned right below the light source box during recognition;

both an upper surface and a lower surface, which are opposite to each other, of the light source box can transmit light, and the light processing unit comprises a concave lens disposed on the upper surface and a convex lens disposed on the lower surface, a primary optical axis of the convex lens coinciding with a primary optical axis of the concave lens and the primary optical axes being in a same line; the light source box further comprises a transmission-reflection mirror disposed between the upper surface and the lower surface, and a light source disposed on a side opposite to the transmission-reflection mirror;

light emitted from the light source unit can be radiated onto the transmission-reflection mirror; the transmission-reflection mirror can reflect the light onto the convex lens; the convex lens can gather the light and then radiate the gathered light onto the alignment mark; and, the light reflected from the alignment mark can enter the camera successively through the convex lens, the transmission-reflection mirror and the concave lens, along said same line.

2. The recognition device according to claim 1, wherein the upper surface is parallel to the lower surface, the transmission-reflection mirror is a plane mirror, and acute included angles between the transmission-reflection mirror and the upper surface and between the transmission-reflection mirror and the lower surface are 45°; and, the light emitted from the light source is parallel light, and an acute included angle between the parallel light and the transmission-reflection mirror is 45°.

3. The recognition device according to claim 1, wherein a primary optical axis of the convex lens is vertical to the upper surface and the lower surface; and, during recognition, the alignment mark is positioned on the primary optical axis of the convex lens, and a distance between the alignment mark and the convex lens ranges from 0.5f to 1.5f, where f is a focal distance of the convex lens.

4. The recognition device according to claim 3, wherein a distance d between the convex lens and the concave lens is equal to f-f', where f' is a focal distance of the concave lens.

5. The recognition device according to claim 1, wherein the camera unit further comprises an adjustment part configured to adjust the focal distance of the camera.

6. The recognition device according to claim 5, wherein the adjustment part comprises an adjustment scaleplate and an adjustment knob, the adjustment knob being configured to adjust the focal distance of the camera according to the scale on the adjustment scaleplate so as to allow the camera to take a zoomed-in, zoomed-out or unchanged image of the alignment mark.

7. The recognition device according to claim 1, further comprising a support frame configured to support the camera unit and the light source unit.

8. The recognition device according to claim 1, wherein the display substrate comprises an array substrate and a color filter substrate.

9. An alignment system, comprising a recognition device configured to recognize an alignment mark on a display substrate and comprising a camera unit and a light source unit, the camera unit being configured to shoot the alignment mark, the light source unit being configured to radiate light onto the alignment mark, wherein the recognition device further comprises a light processing unit configured to process light emitted from the light source unit so that the luminance of the light irradiating onto the alignment mark is greater than the luminance of the light emitted from the light source unit, wherein the camera unit comprises a camera, and the light source unit comprises a light source box, the camera being disposed right above the light source box, the alignment mark being positioned right below the light source box during recognition;

both an upper surface and a lower surface, which are opposite to each other, of the light source box can transmit light, and the light processing unit comprises a concave lens disposed on the upper surface and a convex lens disposed on the lower surface, a primary optical axis of the convex lens coinciding with a primary optical axis of the concave lens and the primary optical axes being in a same line; the light source box further comprises a transmission-reflection mirror disposed between the upper surface and the lower surface, and a light source disposed on a side opposite to the transmission-reflection mirror;

light emitted from the light source unit can be radiated onto the transmission-reflection mirror; the transmission-reflection mirror can reflect the light onto the convex lens; the convex lens can gather the light and then radiate the gathered light onto the alignment mark; and, the light reflected from the alignment mark can enter the camera successively through the convex lens, the transmission-reflection mirror and the concave lens, along said same line.

10. The alignment system according to claim 9, wherein the upper surface is parallel to the lower surface, the transmission-reflection mirror is a plane mirror, and acute included angles between the transmission-reflection mirror and the upper surface and between the transmission-reflection mirror and the lower surface are 45°; and, the light emitted from the light source is parallel light, and an acute included angle between the parallel light and the transmission-reflection mirror is 45°.

11. The alignment system according to claim 9, wherein a primary optical axis of the convex lens is vertical to the upper surface and the lower surface; and, during recognition, the alignment mark is positioned on the primary optical axis of the convex lens, and a distance between the alignment mark and the convex lens ranges from 0.5f to 1.5f, where f is a focal distance of the convex lens.

12. The alignment system according to claim 11, wherein a distance d between the convex lens and the concave lens is equal to f-f', where f' is a focal distance of the concave lens.

13. The alignment system according to claim 9, wherein the camera unit further comprises an adjustment part configured to adjust the focal distance of the camera.

14. The alignment system according to claim 13, wherein the adjustment part comprises an adjustment scaleplate and an adjustment knob, the adjustment knob being configured to adjust the focal distance of the camera according to the scale on the adjustment scaleplate so as to allow the camera to take a zoomed-in, zoomed-out or unchanged image of the alignment mark.

15. The alignment system according to claim 9, wherein the recognition device further comprises a support frame configured to support the camera unit and the light source unit.

16. The alignment system according to claim 9, wherein the display substrate comprises an array substrate and a color filter substrate.

\* \* \* \* \*